(12) United States Patent
Harada et al.

(10) Patent No.: US 8,721,377 B2
(45) Date of Patent: May 13, 2014

(54) OUTBOARD MOTOR

(71) Applicant: Honda Motor Co., Ltd., Tokyo (JP)

(72) Inventors: Yoshihiro Harada, Wako (JP); Koji Kuriyagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/633,283

(22) Filed: Oct. 2, 2012

(65) Prior Publication Data

US 2013/0115831 A1　May 9, 2013

(30) Foreign Application Priority Data

Nov. 9, 2011 (JP) ................................. 2011-245979

(51) Int. Cl.
  *B63H 21/36* (2006.01)
(52) U.S. Cl.
  USPC .......................................... 440/77; 440/88 R
(58) Field of Classification Search
  USPC ................................................ 440/77, 88 R
  See application file for complete search history.

(56) References Cited

U.S. PATENT DOCUMENTS

| | | | |
|---|---|---|---|
| 6,413,131 B1 * | 7/2002 | Phillips et al. | 440/88 R |
| 7,455,560 B2 * | 11/2008 | Arai et al. | 440/77 |
| 7,524,224 B2 | 4/2009 | Ide et al. | |
| 2006/0258235 A1 * | 11/2006 | Kimura et al. | 440/77 |
| 2013/0115831 A1 * | 5/2013 | Harada et al. | 440/1 |

FOREIGN PATENT DOCUMENTS

| | | |
|---|---|---|
| JP | 10-331621 A | 12/1998 |
| JP | 2008-088881 A | 4/2008 |

OTHER PUBLICATIONS

CA Office Action issued in the corresponding CA patent application and dated Nov. 22, 2013.

* cited by examiner

*Primary Examiner* — Lars A Olson
*Assistant Examiner* — Jovon Hayes
(74) *Attorney, Agent, or Firm* — Carrier Blackman & Associates, P.C.; Joseph P. Carrier; Jeffrey T. Gedeon

(57) ABSTRACT

In an outboard motor having an engine and an engine cover adapted to cover the engine, the engine having an air intake passage that opens at the engine cover, it is configured such that a secondary air passage having an inlet disposed at an internal space of the engine cover and an outlet connected to the air intake passage at a position downstream of a throttle valve of the engine. The inlet of the secondary air passage is disposed at an internal space of the engine cover and near a belt cover that covers a timing belt adapted to transmit rotation of a crankshaft of the engine to a cam shaft of the engine.

7 Claims, 9 Drawing Sheets

OUTBOARD MOTOR

BACKGROUND

1. Technical Field

An embodiment of the invention relates to an outboard motor, particularly to an outboard motor that can prevent a throttle valve of a mounted engine from being frozen (iced) and stuck.

2. Background Art

Conventionally, there is widely known an outboard motor in which an inlet of an air intake passage of a mounted engine is positioned at interior space of an engine cover to suck air in the interior space to operate the engine. In such a configuration, since air warmed through, for instance, heat generated by the engine enters the air intake passage, charging efficiency of the engine is degraded and therefore, it leads to disadvantages such as the decrease in the engine output.

To cope with it, an outboard motor having an air intake passage that opens at an engine cover to directly suck external air of lower in temperature than air of internal space, is proposed so as to increase the charging efficiency to improve the engine output, as taught, for example, by Japanese Laid-Open Patent Application No. 2008-88881 ('881). However, in '881, when the outside air temperature is relatively low so that the temperature of sucked air passing through a throttle valve of the air intake passage drops below zero, moisture in the air is frozen (iced) and it may make the throttle valve stuck.

One measure to deal with it is proposed in Japanese Laid-Open Patent Application No. Hei 10(1998)-331621 ('621), in which a flow passage is installed near a throttle valve and a coolant warmed by exhaust heat of an engine is flown therethrough, whereby the throttle valve (more precisely, a throttle body) is warmed, thereby preventing the throttle valve from being frozen (iced) and stuck.

SUMMARY

However, in '621, it is necessary to install the flow passage of the coolant near the throttle valve and it complicates the structure of the outboard motor, accordingly.

An object of an embodiment of this invention is therefore to overcome the foregoing problem by providing an outboard motor that can improve an engine output, while preventing a throttle valve from being frozen and stuck when the air temperature is low, without complicating the structure.

In order to achieve the object, the embodiment of the invention provides an outboard motor having an engine and an engine cover adapted to cover the engine, the engine having an air intake passage that opens at the engine cover, wherein the improvement comprises: a secondary air passage having an inlet disposed at an internal space of the engine cover and an outlet connected to the air intake passage at a position downstream of a throttle valve of the engine.

BRIEF DESCRIPTION OF DRAWINGS

The above and other objects and advantages of an embodiment of the invention will be more apparent from the following description and drawings in which.

DESCRIPTION OF EMBODIMENT

An outboard motor according to an embodiment of the present invention will now be explained with reference to the attached drawings.

Figure 1:
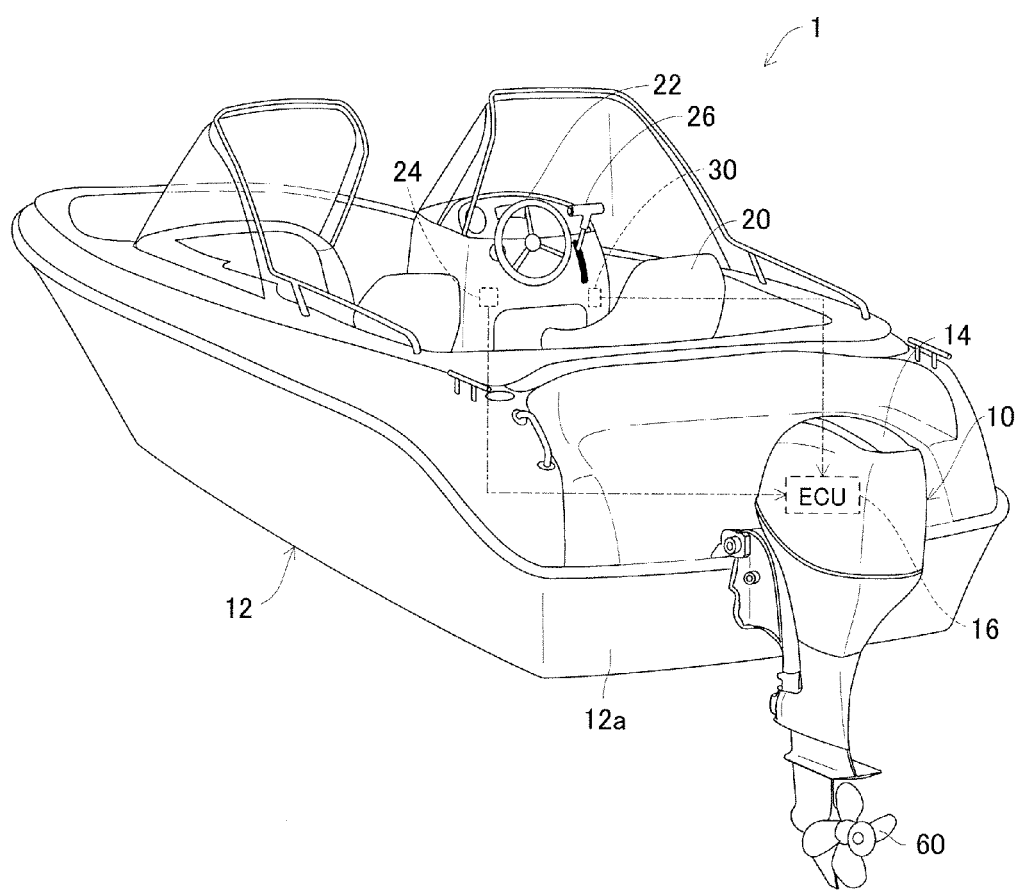
FIG. 1 is an overall schematic view of an outboard motor including a boat (hull) according to an embodiment of the invention.

FIG. 1 is an overall schematic view of an outboard motor including a boat (hull) according to an embodiment of the invention.

In FIG. 1, symbol 1 indicates the boat or vessel whose hull 12 is mounted with the outboard motor 10. As illustrated, the outboard motor 10 is clamped (fastened) to the stern or transom 12a of the hull 12.

The outboard motor 10 has an engine (internal combustion engine; not shown in FIG. 1) and an engine cover 14 that covers the engine. The engine cover 14 is installed in its interior space (i.e., an engine room) with an Electronic Control Unit (ECU) 16 in addition to the engine. The ECU 16 has a microcomputer including a CPU, ROM, RAM and other devices and controls the operation of the outboard motor 10.

A steering wheel 22 is installed near a cockpit (the operator's seat) 20 of the hull 12 to be rotatably manipulated by the operator (not shown). A steering angle sensor 24 is attached on a shaft (not shown) of the steering wheel 22 to produce an output or signal corresponding to the steering angle applied or inputted by the operator through the steering wheel 22.

A shift lever (shift/throttle lever) 26 is provided near the cockpit 20 to be manipulated by the operator. The shift lever 26 can be moved or swung in the front-back direction from the initial position and is used by the operator to input a shift change command (forward, reverse and neutral switch command) and an engine speed regulation command. A lever position sensor 30 is installed near the shift lever 26 and produces an output or signal corresponding to a position of the shift lever 26. The outputs of the sensors 24, 30 are sent to the ECU 16.

Figure 2:
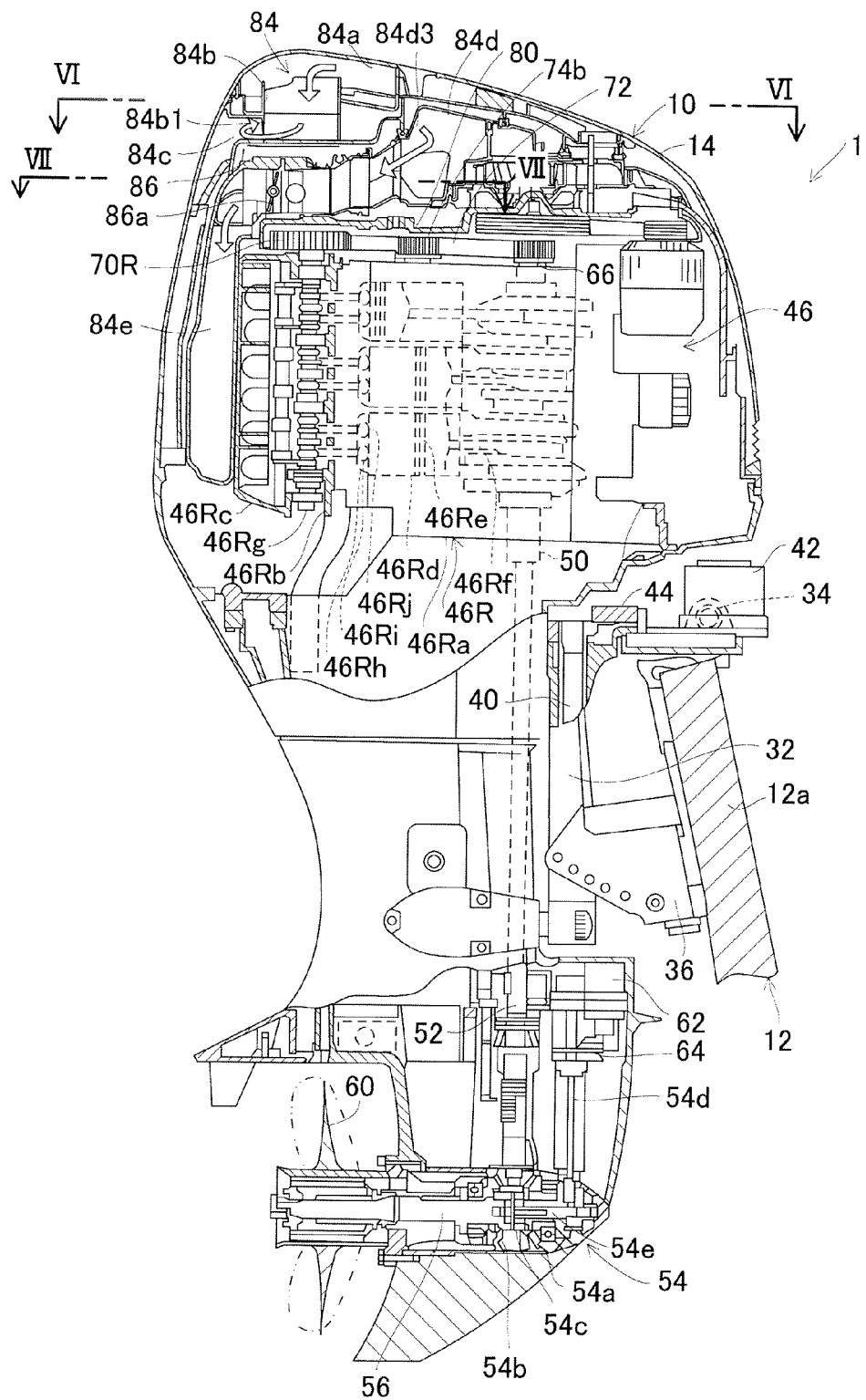
FIG. 2 is an enlarged sectional side view partially showing the outboard motor shown in FIG. 1.
Figure 3:
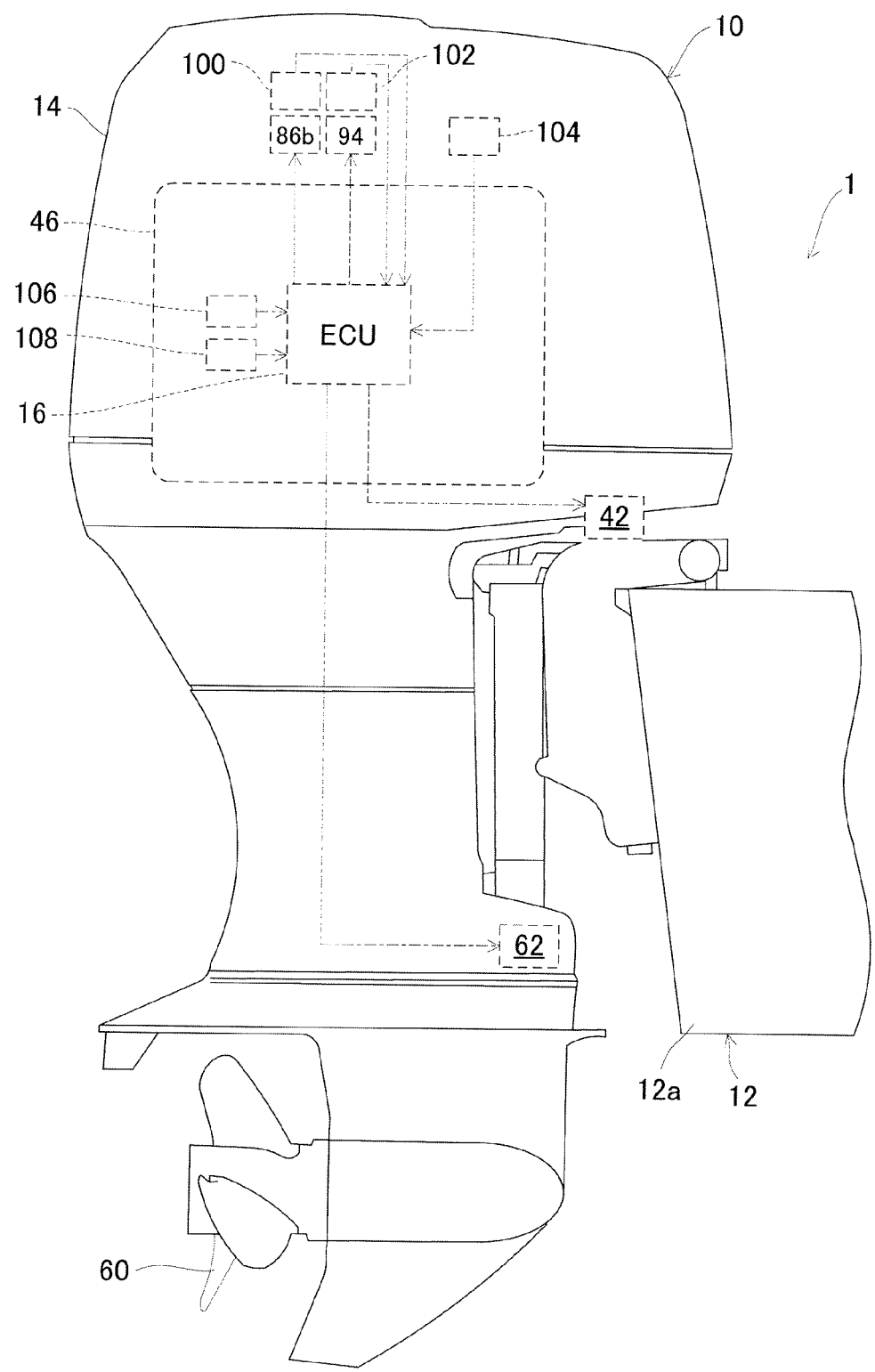
FIG. 3 is an enlarged side view of the outboard motor shown in FIG. 1.
Figure 4:
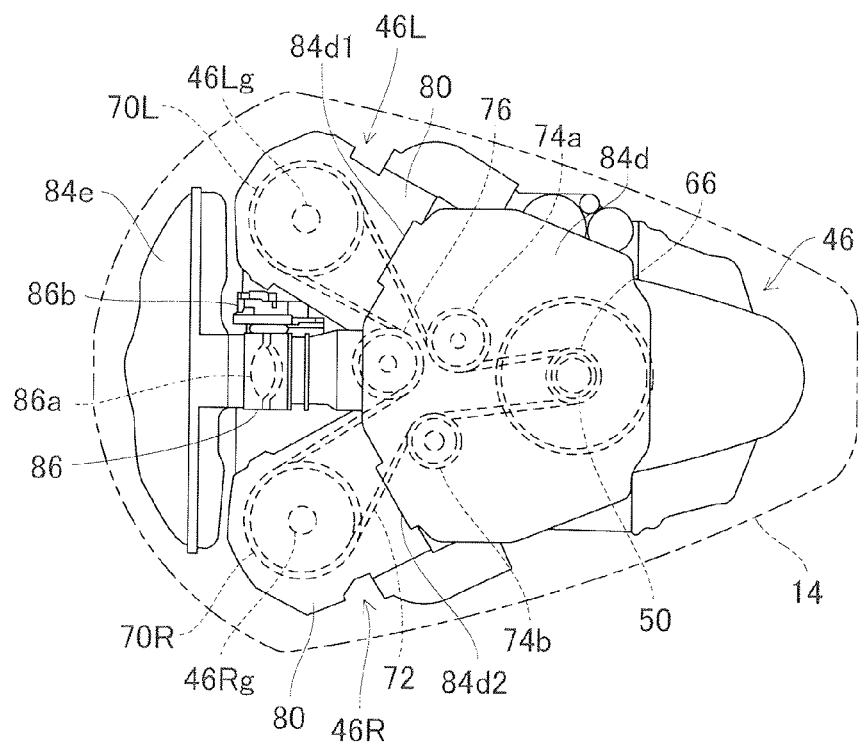
FIG. 4 is a plan view of an engine shown in FIG. 2.
Figure 5:
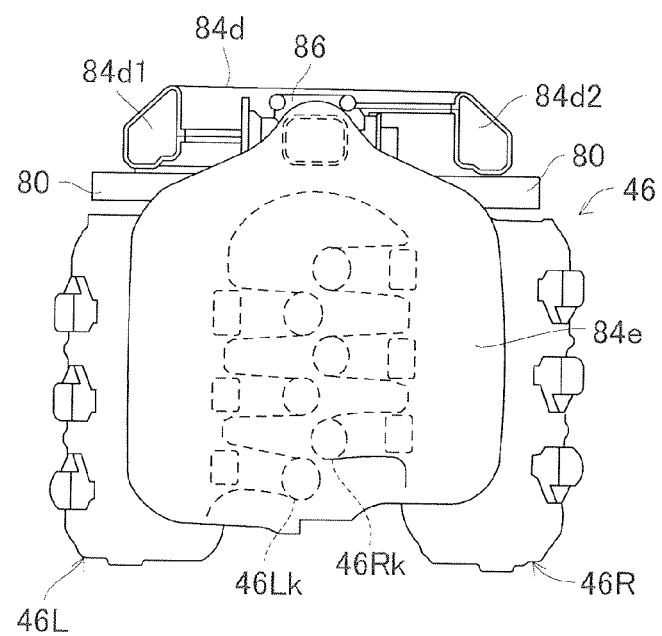
FIG. 5 is a side view of the engine shown in FIG. 4.

FIG. 2 is an enlarged sectional side view partially showing the outboard motor 10 shown in FIG. 1, FIG. 3 is an enlarged side view of the outboard motor 10 shown in FIG. 1, FIG. 4 is a plan view of the engine shown in FIG. 2 and FIG. 5 is a side view of the engine (when viewed from the rear side of the outboard motor 10).

As clearly shown in FIG. 2, the outboard motor 10 is fastened to the hull 12 through a swivel case 32, tilting shaft 34 and stern brackets 36.

An electric steering motor (actuator) 42 for driving a swivel shaft 40 which is housed in the swivel case 32 to be rotatable about the vertical axis, is installed near the swivel case 32. The rotational output of the steering motor 42 is transmitted to the swivel shaft 40 via a speed reduction gear mechanism (not shown) and mount frame 44, whereby the outboard motor 10 is rotated or steered about the swivel shaft 40 serving as a steering axis (about the vertical axis) to the right and left directions.

The outboard motor 10 is installed at its upper portion with the aforesaid engine (now assigned by symbol 46). The engine 46 is installed so that the crankshaft 50 is positioned parallel to the vertical direction.

The outboard motor 10 has a drive shaft 52 that is rotatably supported in parallel with the vertical axis. An upper end of the drive shaft 52 is connected to the crankshaft 50 of the engine 46 and a lower end thereof is connected through a shift mechanism 54 to a propeller shaft 56 that is supported to be rotatable about the horizontal axis.

One end of the propeller shaft 56 is attached with a propeller 60. The shift mechanism 54 includes a forward bevel gear 54a and reverse bevel gear 54b that are connected to the drive shaft 52 to be rotated thereby, a clutch 54c that serves to engage the propeller shaft 56 to either one of the forward and reverse bevel gears 54a, 54b, and other components.

An electric shift motor (actuator) 62 is installed near the shift mechanism 54 to operate the shift mechanism 54 to change a shift position. An output shaft of the shift motor 62 is connected to an upper end of a shift rod 54d of the shift mechanism 54 through a speed reduction gear mechanism 64. Consequently, when the shift motor 62 is operated, the shift rod 54d and a shift slider 54e are appropriately displaced to operate the clutch 54c, thereby changing or switching the shift position among the forward, reverse and neutral positions.

When the shift mechanism 54 is in the forward or reverse position, the rotation of the drive shaft 52 is transmitted to the propeller shaft 56 through the shift mechanism 54, so that the propeller 60 is rotated to generate thrust acting in the direction of making the hull 12 move forward or backward.

Next, details of the engine 46 will be explained with reference to FIGS. 2, 4 and 5.

The engine 46 comprises a spark-ignition, water-cooled, V-type engine, i.e., a V-type six-cylinder engine having two banks each mounted with three cylinders, with a displacement of 3,600 cc. Since the crankshaft 50 is placed to be parallel to the vertical direction, the engine 46 is installed to have a substantially V-shape that spreads toward the rear of the outboard motor 10. In the following, one of the banks on the right side (when looking from the back of the outboard motor 10) will be called the "first bank 46R" and the other the "second bank 46L."

As shown in FIG. 2, the first bank 46R includes a cylinder block 46Ra, a cylinder head 46Rb fixed at the cylinder block 46Ra, and a head cover 46Rc fixed at the cylinder head 46Rb.

In each cylinder 46Rd formed in the inside of the cylinder block 46Ra, a piston 46Re is movably accommodated. The piston 46Re is connected to the crankshaft 50 through a connecting rod 46Rf. A cam shaft 46Rg placed in parallel to the crankshaft 50 is rotatably supported at the cylinder head 46Rb. The foregoing explanation made on the first bank 46R also applies to the second bank 46L.

As shown in FIGS. 2 and 4, an upper end of the crankshaft 50 is attached with a crank timing pulley 66. An upper end of the cam shaft 46Rg of the first bank 46R is attached with a cam pulley 70R while a cam shaft 46Lg (shown in FIG. 4) of the second bank 46L is also attached with a cam pulley 70L.

The crank timing pulley 66 and cam pulleys 70R, 70L are wound with a timing belt 72. Among the pulleys 66, 70R, 70L, idle pulleys 74a, 74b are installed to define a track of the timing belt 72 and a tensioner pulley 76 is installed to give desired tension to the timing belt 72.

As a result, the rotation of the crankshaft 50 is transmitted to the cam shafts 46Rg, 46Lg through the timing belt 72 so that the cam shafts 46Rg, 46Lg are rotated, and consequently, an intake valve and exhaust valve (which of the first bank 46R are indicated by 46Ri and 46Rj) both installed to face a combustion chamber (which of the first bank 46R is indicated by 46Rh) are opened and closed.

The engine 46 is attached on its upper surface with a belt cover 80 that covers the timing belt 72, etc.

Figure 6:
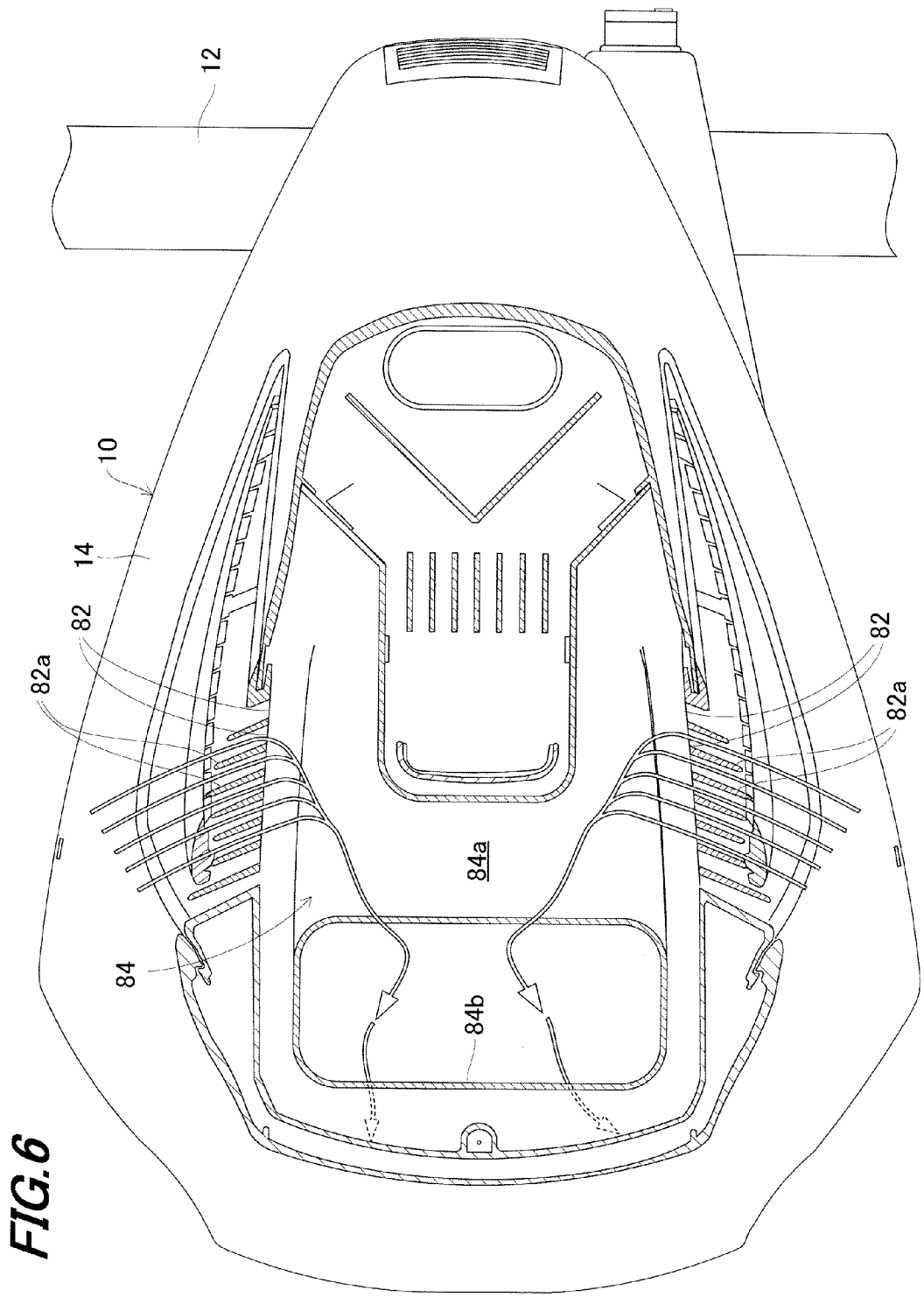
FIG. 6 is an enlarged cross-sectional view taken along a line VI-VI of FIG. 2.

Next, the intake system of the engine 46 will be explained. FIG. 6 is an enlarged cross-sectional view taken along a line VI-VI of FIG. 2 and FIG. 7 is an enlarged cross-sectional view taken along a line VII-VII of FIG. 2.

As shown in FIG. 6, a plurality of air inlets 82 are provided to open at appropriate positions of right and left side surfaces of the engine cover 14. A fin 82a is installed near each of the air inlets 82 to prevent the entry of water, etc., into the engine cover 14 from the exterior. The air inlets 82 are connected to the engine 46 through an air intake passage 84.

The air intake passage 84 includes an entrance passage 84a (shown only in FIGS. 2 and 6) that communicates with the exterior of the engine cover 14 through the air inlets 82, a down-flow passage 84b (shown only in FIGS. 2 and 6) that is connected to the entrance passage 84a and makes intake air sucked from the air inlets 82 and entrance passage 84a flow downward (in the vertical direction), a reversing passage 84c (shown only in FIGS. 2 and 7) that is connected to a lower end 84b1 of the down-flow passage 84b and reverses the flowing direction of the air flowing from the down-flow passage 84b (more exactly, reverses the direction of the air flow from forward to backward of the outboard motor 10 into that from backward to forward), an intake air silencer 84d (shown only in FIGS. 2 and 7) connected to the reversing passage 84c, an intake manifold 84e (shown only in FIG. 2) connected to the intake air silencer 84d through a throttle body 86, and other components. Thus, the air intake passage 84 of the engine 46 is configured to open with the air inlets 82 at the engine cover 14.

Figure 7:
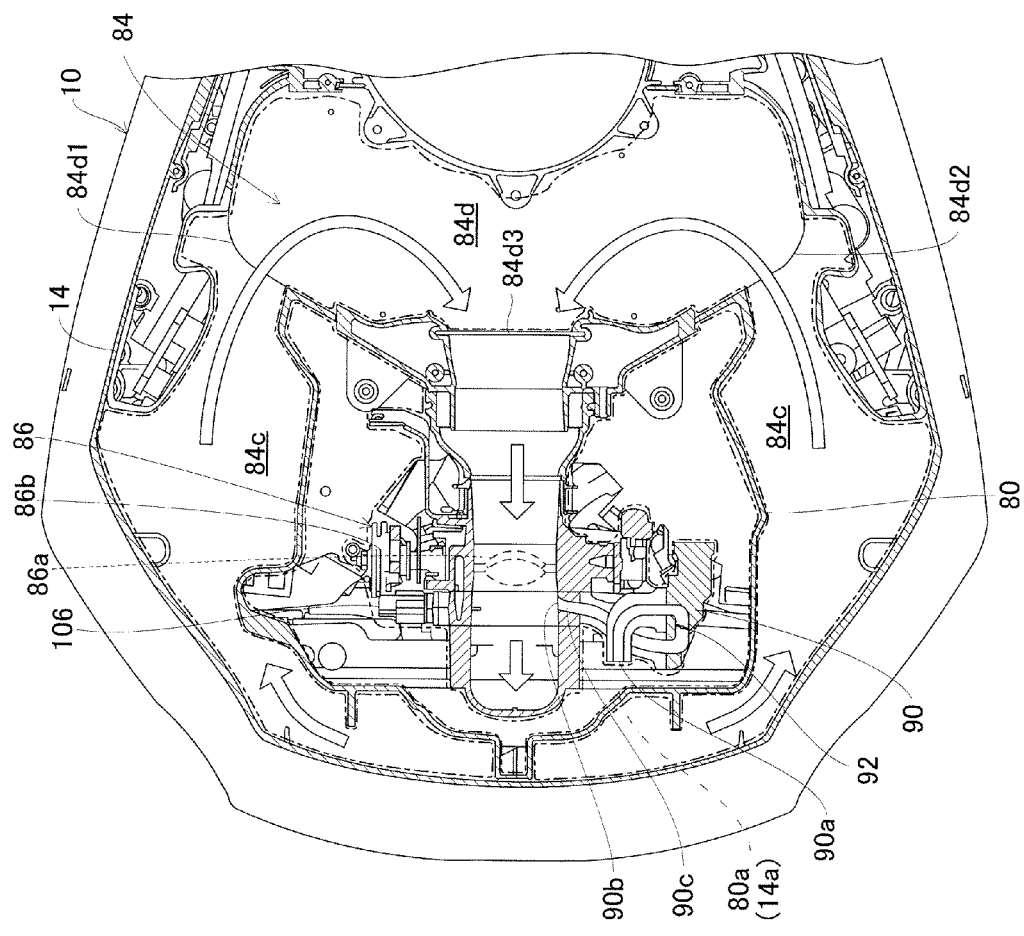
FIG. 7 is an enlarged cross-sectional view taken along a line VII-VII of FIG. 2.

As shown in FIG. 7, the reversing passage 84c branches into two directions, i.e., right and left directions of the outboard motor 10 and is formed to have a shape along the engine cover 14. The intake air silencer 84d has two air intake ports 84d1, 84d2 whose openings face diagonally backward and an exhaust port 84d3 installed between the two air intake ports 84d1, 84d2. An outlet side of the reversing passage 84c is connected to the air intake ports 84d1, 84d2 of the intake air silencer 84d.

The exhaust port 84d3 of the intake air silencer 84d is connected to an inlet side of the throttle body 86. The throttle body 86 has a throttle valve 86a (shown in FIG. 2) therein and is integrally installed with an electric throttle motor (actuator) 86b (shown in FIG. 7) for opening and closing the throttle valve 86a.

An output shaft of the throttle motor 86b is connected to the throttle valve 86a through a speed reduction gear mechanism (not shown) and when the throttle motor 86b is operated, it opens and closes the throttle valve 86a, thereby regulating a flow rate of air sucked in the engine 46.

An outlet side of the throttle body 86 is connected to an inlet side of the intake manifold 84e. An outlet side of the intake manifold 84e is connected to air intake pipes 46Rk, 46Lk (shown in FIG. 5) communicating with the cylinders of the banks 46R, 46L.

Figure 8:
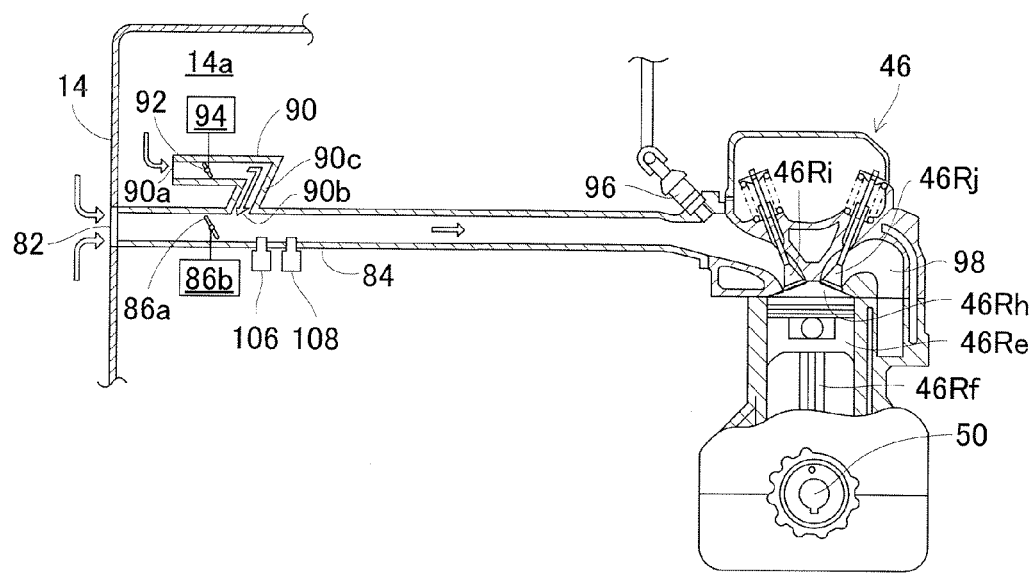
FIG. 8 is a schematic view of the engine shown in FIG. 2, etc.

FIG. 8 is a schematic view of the engine 46 shown in FIG. 2, etc.

The explanation on the intake system of the engine 46 is continued with reference to FIG. 8, etc. The air intake passage 84 of the engine 46 is connected to a secondary air passage 90 that circulates secondary air (intake air) to be supplied to the air intake passage 84 (more precisely, to the vicinity of the throttle valve 86a).

An inlet 90a of the secondary air passage 90 to take in air is disposed at an internal space 14a of the engine cover 14, i.e., as shown in FIG. 7, near the belt cover 80 (more precisely, in an internal space 80a formed by the belt cover 80) in the internal space 14a.

An outlet 90b of the secondary air passage 90 is connected to the air intake passage 84 at a position downstream of the throttle valve 86a. As clearly shown in FIG. 8, in the secondary air passage 90, a passage 90c to the outlet 90b slightly inclines so that the outlet 90b opens toward the throttle valve 86a, whereby air discharged from the secondary air passage 90 directly hits the throttle valve 86a.

A secondary air valve (secondary air flow rate regulating valve) 92 is installed at the middle of the secondary air passage 90 to regulate a flow rate of intake air when the engine 46 is idling or to regulate a flow rate of secondary air to be supplied to the vicinity of the throttle valve 86a when the outside air temperature is relatively low as explained later. The secondary air valve 92 is connected to an electric secondary air flow rate regulating motor (actuator) 94 through a speed reduction gear mechanism (not shown) and when the motor 94 is operated, it opens and closes the secondary air valve 92, thereby regulating the flow rate of air flowing in the secondary air passage 90. The outboard motor 10 is equipped with a power source (not shown) such as a battery attached to the engine 46 to supply operating power to the foregoing motors, etc.

Here, the flow of intake air of the engine 46 configured as stated above will be explained. Intake air entered from the air inlets 82 provided at the engine cover 14 flows through the entrance passage 84a, down-flow passage 84b and reversing passage 84c, then into the intake air silencer 84d from the air intake ports 84d1, 84d2, as shown in FIGS. 2, 6 and 7. After noise of the intake air is eliminated by the intake air silencer 84d, the intake air flows into the throttle body 86 from the exhaust port 84d3. The intake air entered the throttle body 86 is, while being regulated by the throttle valve 86a, flows into the intake manifold 84e.

Air in the internal space 14a of the engine cover 14 flows into the secondary air passage 90 through the inlet 90a. The air in the internal space 14a is relatively warm. Specifically, the temperature of air in a portion (space) surrounded by alternate long and short dashed lines in FIG. 7 is relatively low because the portion corresponds to the air intake passage 84 that directly takes in outside air. On the other hand, since a portion surrounded by alternate long and two short dashed lines is the outside of the air intake passage 84, the temperature of air therein becomes relatively high through heat generated by the engine 46, etc.

As mentioned above, since the inlet 90a of the secondary air passage 90 is positioned at the portion surrounded by the alternate long and two short dashed lines (specifically, near the belt cover 80 (more precisely, at the internal space 80a formed by the belt cover 80) in the internal space 14a of the engine cover 14), the warm air flows into the secondary air passage 90.

The air entered the secondary air passage 90 flows through the outlet 90b toward the downstream of the throttle valve 86a while being regulated by the secondary air valve 92, and then flows into the intake manifold 84e. The air entered the intake manifold 84e flows through the air intake pipe 46Rk and reaches the intake valve 46Ri of each cylinder.

As shown in FIG. 8, an injector 96 is installed near the intake valve 46Ri to inject gasoline fuel to intake air regulated by the throttle valve 86a and secondary air valve 92. The injected fuel mixes with the intake air to form air-fuel mixture that flows into the combustion chamber 46Rh when the intake valve 46Ri is opened.

The air-fuel mixture entered the combustion chamber 46Rh is ignited by a spark plug (not shown) and burned, thereby driving the piston 46Re downward in FIG. 8 to rotate the crankshaft 50. When the exhaust valve 46Rj is opened, the exhaust gas produced by the combustion passes through an exhaust pipe 98 to be discharged outside the engine 46.

The explanation on the outboard motor 10 will be resumed. As shown in FIG. 3, a throttle opening sensor 100 is installed near the throttle valve 86a to produce an output or signal indicative of a throttle opening and an opening sensor 102 is installed near the secondary air valve 92 to produce an output or signal indicative of an opening of the secondary air valve 92.

A crank angle sensor 104 is disposed near the crankshaft 50 of the engine 46 and produces a pulse signal at every predetermined crank angle. Further, as shown in FIGS. 3 and 8, an intake air temperature sensor 106 and a manifold absolute pressure sensor 108 are installed downstream of the throttle valve 86a at the air intake passage 84 of the engine 46. The intake air temperature sensor 106 produces an output or signal indicative of a temperature TA of intake air flowing the downstream of the throttle valve 86a (i.e., the intake air temperature TA of the engine 46), while the manifold absolute pressure sensor 108 produces an output or signal indicative of a manifold absolute pressure (engine load) PBA.

The outputs of the aforesaid sensors are sent to the ECU 16 and based on the inputted outputs, the ECU 16 controls the operation of the outboard motor 10. Specifically, based on the output of the steering angle sensor 24, the ECU 16 controls the operation of the steering motor 42 to steer the outboard motor 10.

Further, based on the output of the lever position sensor 30, etc., the ECU 16 controls the operations of the throttle motor 86b and secondary air flow rate regulating motor 94 to open and close the throttle valve 86a and secondary air valve 92 to regulate a flow rate of intake air, thereby controlling the engine speed, while controlling the operation of the shift motor 62 to operate the shift mechanism 54 to change the shift position.

Further, based on the outputs of the throttle opening sensor 100 and intake air temperature sensor 106, etc., the ECU 16 controls the operation of the secondary air flow rate regulating motor 94 to regulate a flow rate of secondary air, which will be explained later.

Thus, an apparatus for controlling the outboard motor 10 according to this embodiment is a DBW (Drive-By-Wire) control apparatus whose operation system (steering wheel 22 and shift lever 26) has no mechanical connection with the outboard motor 10.

Figure 9:
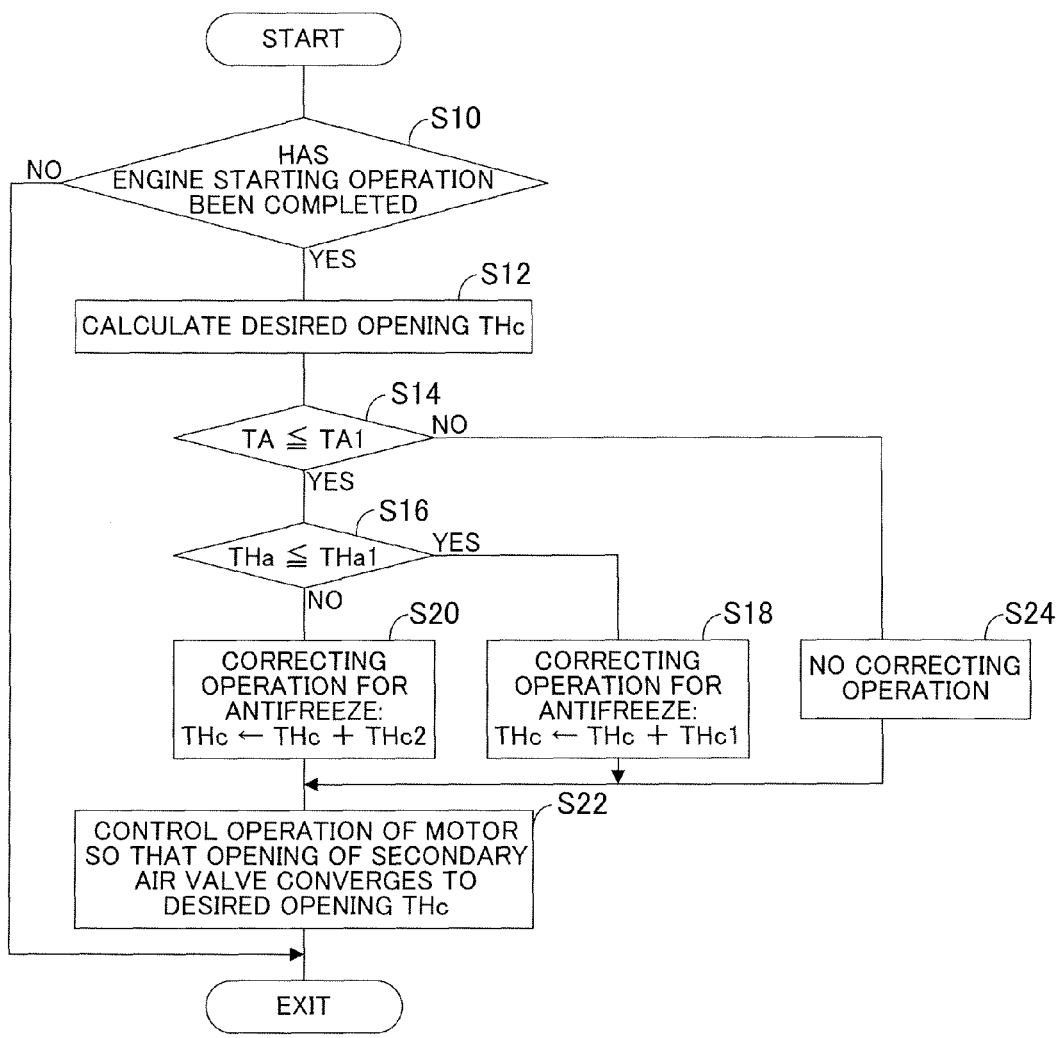
FIG. 9 is a flowchart showing the operation of controlling a secondary air valve executed by an electronic control unit shown in FIG. 1.

FIG. 9 is a flowchart showing, among the operations executed by the ECU 16, the operation of controlling the secondary air valve 92. The illustrated program is executed at predetermined intervals (e.g., 100 milliseconds) by the ECU 16.

The program begins at S (Step) 10 in which it is determined whether a starting operation of the engine 46 has been completed. This determination is made by counting the output pulses of the crank angle sensor 104 to detect (calculate) the engine speed NE and checking as to whether the detected engine speed NE has reached the self-rotating speed.

When the result in S10 is negative, the remaining steps are skipped, while when the result is affirmative, the program proceeds to S12 in which a desired opening THc of the secondary air valve 92 is calculated. Specifically, based on the operating condition of the engine 46 (i.e., based on determinations as to whether the engine 46 is idling and whether it is in the warm-up operation, based on the engine speed NE and manifold absolute pressure PBA, or other parameters), the desired opening THc is calculated.

Next the program proceeds to S14 in which it is determined whether the intake air temperature TA of the engine 46 detected (calculated) from the output of the intake air temperature sensor 106 is equal to or less than a predetermined temperature TA1. The predetermined temperature TA1 is set as a criterion for determining whether moisture in the air (intake air) flowing through the throttle valve 86a is frozen (iced) so that the throttle valve 86a is likely to be frozen and stuck, more exactly, set to a value indicating a temperature at or below zero (e.g., 0° C.). Thus, the processing of S14 is made for determining whether it is in the operating condition where the throttle valve 86a is likely to be frozen and stuck.

When the result in S14 is affirmative, the program proceeds to S16 in which, based on the output of the throttle opening sensor 100, the throttle opening THa is detected (calculated) and it is determined whether the detected throttle opening THa is equal to or less than a predetermined opening THa1. The predetermined opening THa1 is set as a criterion for determining that a flow rate of intake air flowing through the throttle valve 86a is relatively low when the throttle opening THa is equal to or less than this criterion value, e.g., set to 30 degrees.

When the result in S16 is affirmative, i.e., when the flow rate of intake air flowing through the throttle valve 86a is relatively low so that it is estimated that the temperature on the inlet side of the throttle body 86 is equal to or less than −10° C. or thereabout, the program proceeds to S18 in which the desired opening THc calculated in S12 is corrected, i.e., increased by a first predetermined value THc1, in other words, the first predetermined value THc1 is added to the desired opening THc. The first predetermined value THc1 is set to, for instance, a value of 10% of the opening of the secondary air valve 92, i.e., a value corresponding to 10% when defining the fully-closed opening as 0% (0 degree) and the fully-opened opening as 100% (90 degrees), more exactly, set to 9 degrees.

On the other hand, when the result in S16 is negative, i.e., when the throttle opening THa is greater than the predetermined opening THa1, since it means that the flow rate of intake air flowing through the throttle valve 86a is relatively high so that it is estimated that the temperature on the inlet side of the throttle body 86 is equal to or less than −15° C. or thereabout, the program proceeds to S20 in which the desired opening THc is corrected, i.e., increased by a second predetermined value THc2, in other words, the second predetermined value THc2 is added to the desired opening THc. The second predetermined value THc2 is set greater than the first predetermined value THc1, for instance, set to a double value of the first predetermined value THc1 (i.e., set to an opening corresponding to 20% of the opening of the secondary air valve 92, more exactly, 18 degrees).

Thus, in S18 and S20, the desired opening THc calculated in S12 is corrected based on the intake air temperature TA and throttle opening THa of the engine 46.

After the processing of S18 or S20, the program proceeds to S22 in which the operation of the secondary air flow rate regulating motor 94 is controlled so that an opening THb of the secondary air valve 92 converges to the corrected desired opening THc. As a result, warm air in the internal space 14a of the engine cover 14 is supplied to the vicinity of the throttle valve 86a through the secondary air passage 90 at a flow rate regulated in accordance with the temperature TA of intake air flowing through the throttle valve 86a, so that it warms up the area around the throttle valve 86a. Consequently, it becomes possible to prevent the throttle valve 86a from being frozen and stuck.

When the result in S14 is negative, since it means that the throttle valve 86a is not likely to be frozen and stuck, the program proceeds to S24 in which the desired opening THc of the secondary air valve 92 is not corrected, and to S22 in which the aforementioned processing is conducted, whereafter the program is terminated.

Figure 10:
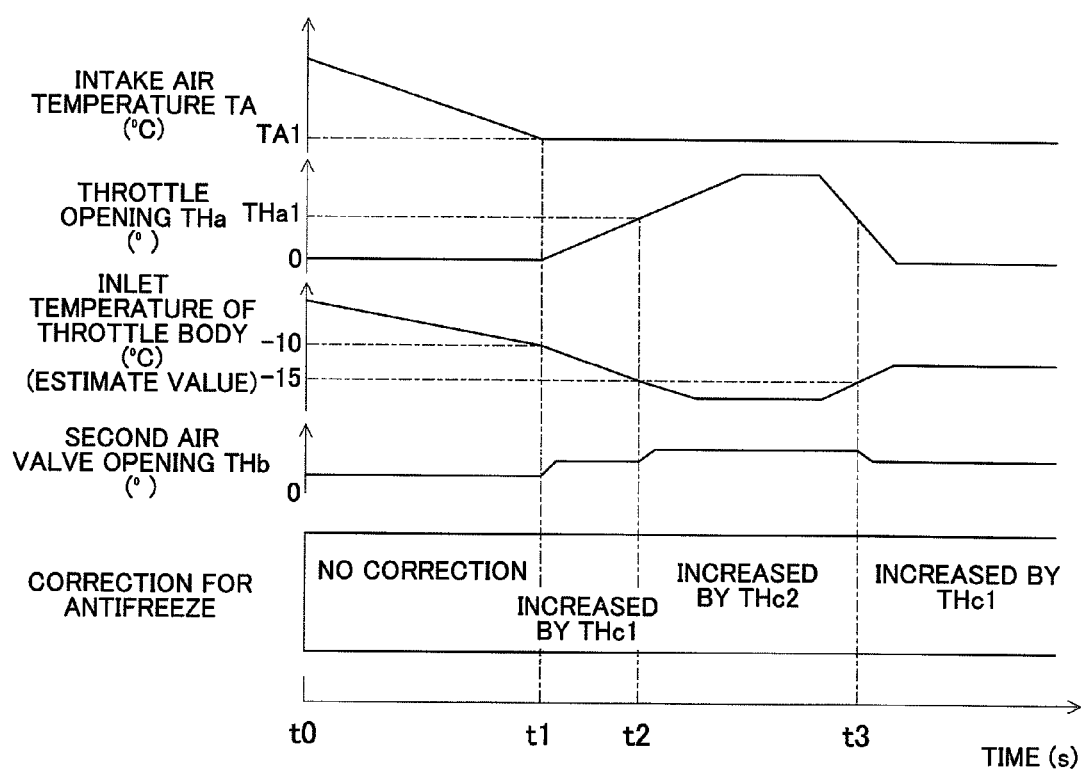
FIG. 10 is a time chart for explaining the process of the FIG. 9 flowchart.

FIG. 10 is a time chart for explaining the process of the foregoing operation.

As shown in FIG. 10, from the time t0 to t1, since the intake air temperature TA is higher than the predetermined temperature TA1, the correcting operation of the secondary air valve 92 for antifreeze is not conducted (S24). When, at the time t1, the intake air temperature TA is equal to or less than the predetermined temperature TA1 and the throttle opening THa is equal to or less than the predetermined opening THa1, the desired opening THc of the secondary air valve 92 is corrected, i.e., increased by the first predetermined value THc1 (S18). As a result, the secondary air valve 92 is operated in the opening direction by the first predetermined value THc1 (S22).

At the time t2, when the intake air temperature TA is equal to or less than the predetermined temperature TA1 and the throttle opening THa is greater than the predetermined opening THa1, the desired opening THc of the secondary air valve 92 is corrected, i.e., increased by the second predetermined value THc2 (S20). As a result, the secondary air valve 92 is operated in the opening direction further from the opening position set through the correcting operation with the first predetermined value THc1 (S22).

After that, the throttle valve 86a is closed and when, at the time t3, the throttle opening THa becomes equal to or less than the predetermined opening THa1, the correction of the desired opening THc of the secondary air valve 92 is returned to that using the first predetermined value THc1 (S18) and in response thereto, the secondary air valve 92 is operated in the closing direction (S22).

As stated above, this embodiment is configured to have an outboard motor (10) having an engine (internal combustion engine 46) and an engine cover (14) adapted to cover the engine, the engine having an air intake passage (84) that opens at the engine cover, wherein the improvement comprises: a secondary air passage (90) having an inlet (90a) disposed at an internal space (14a) of the engine cover and an outlet (90b) connected to the air intake passage at a position downstream of a throttle valve (86a) of the engine.

Since air of lower in temperature than air in the internal space 14a of the engine cover 14 is directly taken in through the air intake passage 84, the charging efficiency of the engine 46 can be increased and it improves the engine output. When the outside air temperature is low, air in the internal space 14a of the engine cover 14, i.e., air warmed through heat generated by the engine 46, etc., can be supplied to the vicinity of the throttle valve 86a through the secondary air passage 90, so that the throttle valve 86a is warmed up thereby and it becomes possible to prevent the throttle valve 86a from frozen (iced) and stuck. Further, this configuration does not use a coolant passage of the engine to warm up the throttle valve, thereby enabling to avoid a complex structure.

Further, in the outboard motor, the inlet of the secondary air passage is disposed at an internal space (14a) of the engine cover and near a belt cover (80) that covers a timing belt (72) adapted to transmit rotation of a crankshaft (50) of the engine to a cam shaft (46Rg) of the engine.

Specifically, since the inlet 90*a* of the secondary air passage 90 is positioned in the internal space 14*a* of the engine cover 14 at a location near the belt cover 80 that is placed adjacent to the engine 46, air warmed through heat generated by the engine 46 can be efficiently supplied to the vicinity of the throttle valve 86*a* through the secondary air passage 90, and it becomes possible to reliably prevent the throttle valve 86*a* from frozen and stuck.

Further, in the outboard motor, the air intake passage includes: an entrance passage (84*a*) that communicates with exterior of the engine cover through a plurality of air inlets (82) that are connected to the engine through the air intake passage; a down-flow passage (84*b*) that is connected to the entrance passage and makes intake air sucked from the air inlets and the entrance passage flow downward in a vertical direction; a reversing passage (84*c*) that is connected to a lower end (84*b*1) of the down-flow passage and reverses a flowing direction of the air flowing from the down-flow passage; an intake air silencer (84*d*) connected to the reversing passage; and an intake manifold (84*e*) connected to the intake air silencer through a throttle body (86).

With this, it becomes possible to further reliably prevent the throttle valve 86*a* from frozen and stuck.

Further, in the outboard motor, the reversing passage branches into right and left directions of the outboard motor and is formed to have a shape along the engine cover. With this, it becomes possible to further reliably prevent the throttle valve 86*a* from frozen and stuck.

Further, in the outboard motor, the intake air silencer has two air intake ports (84*d*1, 84*d*2) whose openings face diagonally backward and connected to an outlet side of the reversing passage; and an exhaust port (84*d*3) installed between the two air intake ports and connected to an inlet side of the throttle body. With this, it becomes possible to further reliably prevent the throttle valve 86*a* from frozen and stuck.

Further, in the outboard motor, the engine cover is provided with a plurality of air inlets (82) and a fin (82*a*) is provided near each of the air inlets that are connected to the engine through the air intake passage. With this, it becomes possible to further reliably prevent the throttle valve 86*a* from frozen and stuck.

The outboard motor further includes a secondary air valve (92) installed at the secondary air passage; an actuator (electric secondary air flow rate regulating motor (94) adapted to open and close the secondary air valve; a desired opening calculator (ECU 16, S12) adapted to calculate a desired opening (THc) of the secondary air valve based on operating condition of the engine; a corrector (ECU 16, S18, S20) adapted to correct the calculated desired opening based on an intake air temperature (TA) of the engine and a throttle opening (THa) of the engine; and an actuator controller (ECU 16, S22) adapted to control operation of the actuator so that an opening of the secondary air valve converges to the corrected desired opening.

With this, since a flow rate of secondary air to be supplied to the vicinity of the throttle valve 86*a* can be controlled to an appropriate value in accordance with the intake air temperature TA and throttle opening THa, it becomes possible to reliably prevent the throttle valve 86*a* from being frozen and stuck when the outside air temperature is low.

Further, in the outboard motor, the corrector increases the desired opening by a first predetermined value (THc1) when the intake air temperature is equal to or less than a predetermined temperature (TA1) and the throttle opening is equal to or less than a predetermined opening (THa1).

With this, for example, the predetermined temperature TA1 and predetermined opening THc1 can be set to values as criteria for determining whether air flowing through the throttle valve 86*a* is at a temperature at or below zero degree so that the throttle valve 86*a* is likely to be frozen and stuck. When the frozen and stuck throttle valve 86*a* is likely, the desired opening THc of the secondary air valve 92 is corrected, i.e., increased by the first predetermined value THc1, in other words, a flow rate of secondary air to be supplied to the vicinity of the throttle valve 86*a* is controlled to become higher. Therefore, it becomes possible to more reliably prevent the throttle valve 86*a* from being frozen and stuck.

Further, in the outboard motor, the corrector increases the desired opening by a second predetermined value (THc2) set greater than the first predetermined value when the intake air temperature is equal to or less than the predetermined temperature and the throttle opening is greater than the predetermined opening.

When the throttle opening THa is relatively large (i.e., a flow rate of intake air flowing through the throttle valve 86*a* is relatively high) so that it is estimated that the throttle valve 86*a* is likely to be frozen and stuck, the calculated desired opening THc is increased by the second predetermined value THc2 that is set greater than the first predetermined value THc1, i.e., a flow rate of secondary air to be supplied to the vicinity of the throttle valve 86*a* is controlled to become further higher. Therefore, it becomes possible to further reliably prevent the throttle valve 86*a* from being frozen and stuck.

It should be noted that, although the outboard motor is taken as an example, this invention can be applied to an inboard/outboard motor. Further, although the predetermined temperature TA1, predetermined opening THa1, first and second predetermined values THc1, THc2, displacement of the engine 46 and other values are indicated with specific values in the foregoing, they are only examples and not limited thereto.

Japanese Patent Application No. 2011-245979, filed on Nov. 9, 2011, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An outboard motor having an engine and an engine cover adapted to cover the engine, the engine having an air intake passage that opens at the engine cover, wherein the air intake passage includes:
an entrance passage that communicates with exterior of the engine cover through a plurality of air inlets that are connected to the engine through the air intake passage;
a down-flow passage that is connected to the entrance passage and makes intake air sucked from the air inlets and the entrance passage flow downward in a vertical direction;
a reversing passage that is connected to a lower end of the down-flow passage and reverses a flowing direction of the air flowing from the down-flow passage;
an intake air silencer connected to the reversing passage; and
an intake manifold connected to the intake air silencer through a throttle body,
wherein the intake air silencer has two air intake ports whose openings face diagonally backward and connected to an outlet side of the reversing passage; and an exhaust port installed between the two air intake ports and connected to an inlet side of the throttle body, wherein the improvement comprises:

a secondary air passage having an inlet disposed at an internal space of the engine cover and an outlet connected to the air intake passage at a position downstream of a throttle valve of the engine.

2. The outboard motor according to claim 1, wherein the inlet of the secondary air passage is disposed at an internal space of the engine cover and near a belt cover that covers a timing belt adapted to transmit rotation of a crankshaft of the engine to a cam shaft of the engine.

3. The outboard motor according to claim 1, wherein the reversing passage branches into right and left directions of the outboard motor and is formed to have a shape along the engine cover.

4. The outboard motor according to claim 1, wherein the engine cover is provided with a plurality of air inlets and a fin is provided near each of the air inlets that are connected to the engine through the air intake passage.

5. The outboard motor according to claim 1, further including:

a secondary air valve installed at the secondary air passage;

an actuator adapted to open and close the secondary air valve;

a desired opening calculator adapted to calculate a desired opening of the secondary air valve based on operating condition of the engine;

a corrector adapted to correct the calculated desired opening based on an intake air temperature of the engine and a throttle opening of the engine; and an actuator controller adapted to control operation of the actuator so that an opening of the secondary air valve converges to the corrected desired opening.

6. The outboard motor according to claim 5, wherein the corrector increases the desired opening by a first predetermined value when the intake air temperature is equal to or less than a predetermined temperature and the throttle opening is equal to or less than a predetermined opening.

7. The outboard motor according to claim 6, wherein the corrector increases the desired opening by a second predetermined value set greater than the first predetermined value when the intake air temperature is equal to or less than the predetermined temperature and the throttle opening is greater than the predetermined opening.

\* \* \* \* \*